United States Patent Office 3,057,841
Patented Oct. 9, 1962

3,057,841
POLYMERISATION OF ETHYLENE WITH LITHIUM BOROHYDRIDE AND GROUP IVB METAL HALIDES
Alaric Louis Jeffrey Raum, Teddington, England, assignor to The Distillers Company Limited, Edinburgh, Scotland, a company of Great Britain
No Drawing. Filed Oct. 1, 1956, Ser. No. 612,948
Claims priority, application Great Britain Oct. 18, 1955
5 Claims. (Cl. 260—94.9)

The present invention relates to a process for the polymerisation of ethylene to give linear polymers having high molecular weights, which polymers are of great utility for the preparation of films, fibres, moulded articles and the like. It relates particularly to a process for the production of high molecular weight linear polyethylenes under mild conditions of temperature and pressure.

Hitherto the commercially practical processes for the polymerisation of ethylene to give resins of technical importance have involved the use of high temperatures and very high pressures.

It has been proposed to form high molecular weight polymers of ethylene by processes which comprise contacting gaseous ethylene with a catalyst system consisting of a mixture of aluminium trialkyls or of organic derivatives of aluminium having the formula $R_2AlX$ or organic derivatives of magnesium or zinc in conjunction with a compound of a metal of groups $IVa$ to $VIa$ of the periodic table. In the above formula R is hydrogen or a hydrocarbon radical or residue and X is hydrogen, a halogen atom, an alkoxy group, an aryloxy group, a radical derived from a secondary amine, a secondary amide, a mercaptan, a thiophenol, a carboxylic acid or a sulphonic acid. The organic derivatives of zinc and magnesium mentioned in these prior proposals are the di-alkyl derivatives and the Grignard-type compounds.

These processes yield valuable products, but many of the organo-metallic compounds present in the catalyst system are relatively difficult to synthesise. Moreover, many of the compounds are not stable or easily handled.

An object of the present invention is to provide a process for the production of high quality, high molecular weight polyethylene by a process which involves the use of a new catalyst system. It is a further object to provide a process whereby the polymerisation of ethylene may be effected rapidly under mild conditions of temperature and pressure.

Accordingly the present invention is the process for the production of polyethylene which comprises contacting ethylene with a catalyst system formed by mixing lithium borohydride with a titanium, zirconium or vanadium halide.

Lithium borohydride is a well defined crystalline solid having the formula $LiBH_4$. It is readily available and relatively easy to prepare. It also has the advantage that it is unaffected when exposed to dry air for long periods of time.

Any titanium, zirconium or vanadium halide can be employed and most suitably the chlorides of these metals in their tri- or tetravalent form are used. The preferred compounds to use as components of the catalyst system are titanium tetrachloride and vanadium tetrachloride. Titanium trichloride when prepared as described in our co-pending British application No. 13317/56 and zirconium tetrachloride are other specific examples of suitable components of catalyst systems according to the present invention.

The proportion of lithium borohydride to the halide compound is not critical. When titanium and zirconium tetrachlorides are employed useful and economic catalyst systems are obtained by mixing the two ingredients in the approximate proportions of two mols of lithium borohydride to one of the tetrachloride compound.

The preparation of the catalyst system by mixing the lithium borohydride with the halide compound and the subsequent polymerisation are preferably carried out in the absence of molecular oxygen, carbon dioxide and water. Most suitably all reactions are carried out in an atmosphere of ethylene. An inert gas such as nitrogen can be used to flush out the polymerisation vessel prior to the admission of the various components of the reaction mixture. The catalyst systems and/or their components are destroyed by reaction with oxygen, carbon dioxide or water and, consequently, if any of these are present in excess little or no polymerisation will take place. Small quantities of oxygen, carbon dioxide or water are removed by reaction with part of the catalyst system or its components and any undestroyed catalyst left after this reaction initiates polymerisation in the usual way.

The polymerisation reaction is most suitably carried out with the components of the catalyst system dispersed or dissolved in an inert liquid vehicle through which ethylene can be passed. Most suitably the inert liquid vehicle consists of a solvent for one of the compounds which react together to make the catalyst system and for ethylene. Examples of the preferred liquid vehicles are aliphatic, cycloaliphatic and hydrogenated aromatic hydrocarbons such as pentane, hexane, cyclohexane, tetrahydronaphthalene, decahydronaphthalene, the higher paraffins, and mixtures thereof. Aromatic hydrocarbons such as benzene and xylene, halogenated aromatic hydrocarbons such as orthodichlorbenzene and chlorinated naphthalene and mixtures thereof can also be employed but fully saturated compounds are preferable. The quantity of solvent employed may be varied considerably and should be such that the final recovery of the polyethylene is facilitated.

The process of the present invention can readily be brought about by mixing the two components forming the catalyst system with an inert liquid vehicle in a suitable vessel and then allowing ethylene to enter the vessel. Alternatively the components of the catalyst system can be mixed in the presence of the ethylene. In this case the lithium borohydride or the halide compound is mixed with a suitable liquid vehicle, for instance, one of those mentioned above, and the liquid mixture is saturated with ethylene. The other component of the catalyst system is then added when it will be found that rapid polymerisation of ethylene takes place and further quantities of ethylene may be passed into the reaction mixture and polymerised. It is generally advantageous to stir the reaction mixture vigorously during the polymerisation reaction.

The catalyst systems of the present invention are very active and polymerisation may be initiated at normal ambient temperatures or below, for instance at 10° C. The rate of polymerisation is generally increased by raising the temperature of the reaction mixture, but normally it is undesirable to employ temperatures above about 150° C. It should be noted that above such a temperature there is a danger that the efficiency of the catalyst system may be reduced and perhaps destroyed. A convenient temperature range within which the polymerisation may be carried out at a useful rate is 50°–150° C. When the polymerisation is to be carried out at an elevated temperature, the mixture forming the catalyst system can be heated either before or after the introduction of the ethylene.

It is unnecessary to employ elevated pressures in order to bring about the polymerisation of ethylene according to the present invention. However, for convenience of handling gaseous ethylene it may be advantageous in certain circumstances to employ slightly elevated pressures, and, accordingly, the polymerisation process can be carried out with the ethylene under a pressure in the range 50–500 pounds per square inch gauge (p.s.i.g.)

The method by which the polyethylene produced according to the present invention is recovered from the reaction mixture and worked into a final form is not critical. However, it is advantageous to include a mineral acid washing stage in the working up in order to remove inorganic contaminants.

The process may be carried out batchwise or continuously and by its use high yields of high grade polyethylene can be produced.

The following examples illustrate embodiments of the present invention. The parts by weight and the parts by volume bear the same relationship to each other as do grams to millilitres.

*Example 1*

3.8 parts by weight of lithium borohydride and 3 parts by weight of titanium tetrachloride were mixed with 100 parts by volume of sodium dried petroleum ether (100°–120° fraction) in a glass tube which was then placed in a steel reaction vessel having a capacity of 300 parts by volume. After all air had been pumped out of the vessel, ethylene was admitted at a pressure of 250 to 300 p.s.i.g. The temperature of the vessel was then raised to 150° C. by means of an oil bath and the reaction was allowed to proceed for about 30 minutes, more ethylene being admitted, as necessary, to maintain the pressure.

At the end of this period the tube was removed from the reaction vessel and the contents treated carefully with ethanol, under nitrogen, to destroy any unreacted lithium borohydride. The mixture was then acidified with hydrochloric acid and the crude polyethylene removed by filtration. The final, pure white polyethylene was obtained by washing the product first with ethanolic hydrochloric acid and then with pure ethanol, followed by drying in an oven.

This product was pressed at 140° C. into a thin, transparent, non-brittle film, which was shown by infra-red spectroscopy to be high molecular weight, linear polyethylene.

*Example 2*

A reaction was carried out as in Example 1, employing 1 part by weight of lithium borohydride and 1 part by weight of titanium tetrachloride in 100 parts by volume of petroleum ether. Ethylene was admitted at a pressure of 250–300 p.s.i.g. and the reaction allowed to proceed, with no external heating, for 18 hours. The product was isolated as in Example 1 and was found to be high molecular weight, linear polyethylene.

*Example 3*

3 parts by weight of lithium borohydride and 8 parts by weight of zirconium tetrachloride were mixed in a glass tube containing 100 parts by volume of petroleum ether (100–120° C. fraction-aromatic free). The tube was then placed in a stainless steel reaction vessel, any air present being pumped out. Ethylene was then admitted at a pressure of 250–300 p.s.i.g. and the temperature raised to 150° C. The reaction was allowed to proceed for 160 minutes, more ethylene being admitted, as necessary, to maintain the pressure. The pressure was then released, the tube removed and the reaction mixture treated with ethanol and ethanolic hydrochloric acid. A residue of polyethylene was obtained which was isolated by filtration, washed with ethanol and dried. The polyethylene was pressed at 155° C. to give a tough, clear film which was shown by infra-red spectroscopy to be high molecular weight, linear polyethylene.

*Example 4*

A reaction similar to that described in Example 1 was carried out employing 3 parts by weight of lithium borohydride and 3 parts by weight of vanadium tetrachloride in 100 parts by volume of the petroleum ether.

As in Example 1, a good yield of high molecular weight, linear polyethylene was obtained, a sample of which was pressed to give a tough, clear film.

*Example 5*

To a reaction vessel fitted with a stirrer and inlet and outlet tubes for ethylene, 1 part by weight of lithium borohydride, 4.4 parts of titanium tetrachloride and 300 parts by volume of dry petroleum ether (100–120° C. fraction-aromatic free) were added under an atmosphere of nitrogen. The reaction mixture was well stirred and pure ethylene was bubbled in, the temperature of the mixture being slowly raised to 40° C. when external heating was discontinued. Rapid polymerisation occurred and the temperature rose to 65° C. The polymerisation was allowed to continue for 3 hours, the temperature being maintained at 65° C.

At the end of this period the flask was cooled and the polyethylene isolated as described in the previous examples as 38.4 parts by weight of a tough, flexible, transparent film. It had a tensile strength of 3330 lbs. per sq. inch and an impact strength greater than $100 \times 10^5$ ergs per square centimeter.

I claim:

1. A process for the production of polyethylene which comprises contacting gaseous ethylene with a catalyst system formed by mixing lithium borohydride with a halide compound selected from the group consisting of titanium, zirconium and vanadium halides, at a temperature in the range of from 10° to 150° C. and at a pressure between atmospheric pressure and 500 p.s.i.g.
2. A process as claimed in claim 1, wherein the halide compound is a chloride.
3. A process as claimed in claim 1, wherein the halide compound is titanium tetrachloride.
4. A process as claimed in claim 1, wherein the halide compound is vanadium tetrachloride.
5. A process for the production of polyethylene which comprises contacting gaseous ethylene with a catalyst system formed by mixing lithium borohydride with a halide compound selected from the group consisting of titanium, zirconium and vanadium halides, at a temperature in the range of from 10° to 150° C., at a pressure between atmospheric pressure and 500 p.s.i.g. and in the presence of an inert hydrocarbon liquid.

References Cited in the file of this patent

UNITED STATES PATENTS

| | | |
|---|---|---|
| 2,721,189 | Anderson et al. | Oct. 18, 1955 |
| 2,728,757 | Field et al. | Dec. 27, 1955 |
| 2,822,357 | Brebner | Feb. 4, 1958 |
| 2,839,518 | Brebner | June 17, 1958 |
| 2,880,199 | Jezl et al. | Mar. 31, 1959 |

FOREIGN PATENTS

| | | |
|---|---|---|
| 1,137,459 | France | Jan. 14, 1957 |